March 9, 1954      S. MENDELSOHN      2,671,629
SUPPORT FOR CAMERAS AND SYNCHRONIZERS
Filed June 23, 1949
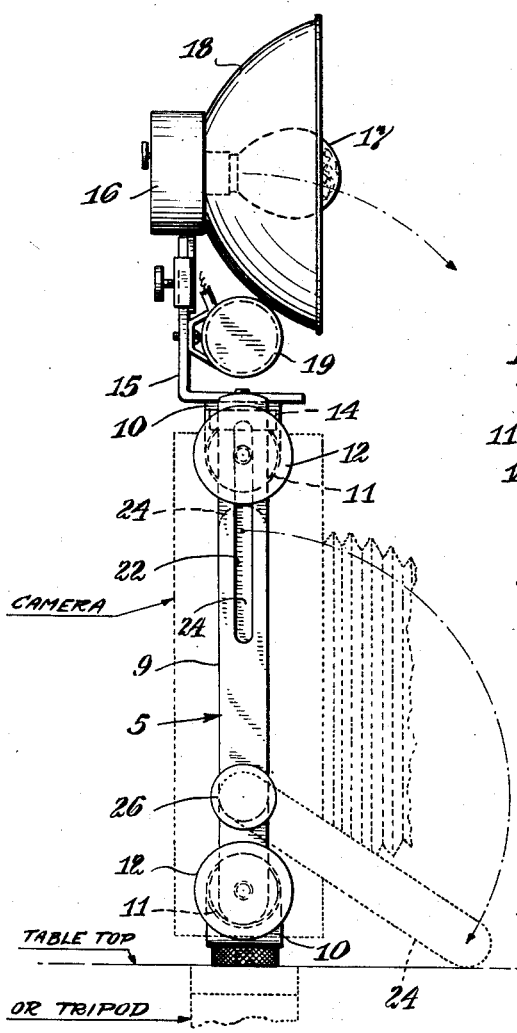
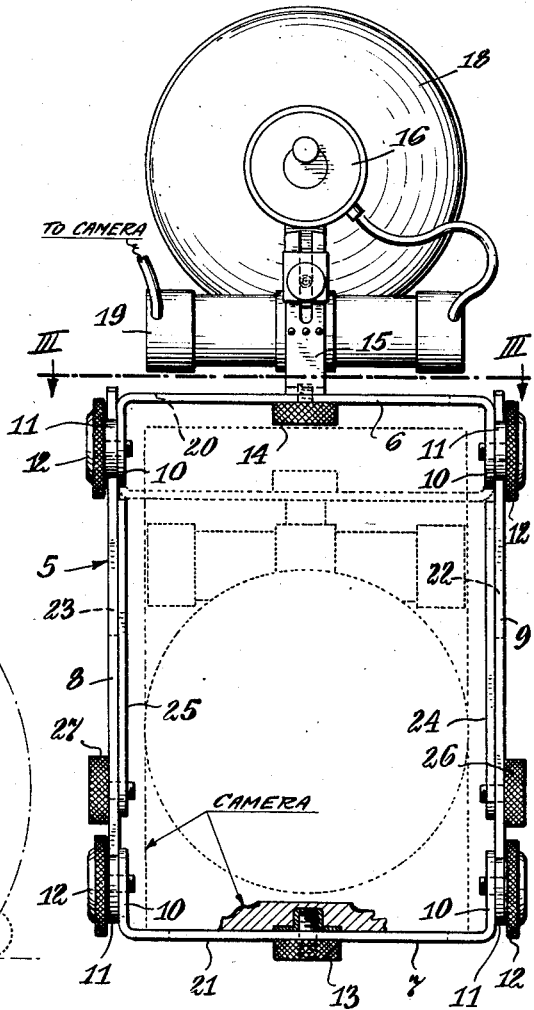
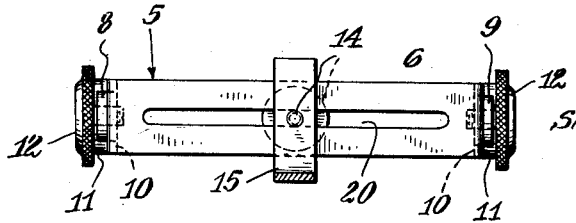
INVENTOR
SAMUEL MENDELSOHN.
ATTORNEY Patented Mar. 9, 1954

2,671,629

UNITED STATES PATENT OFFICE 2,671,629

SUPPORT FOR CAMERAS AND SYNCHRONIZERS

Samuel Mendelsohn, Glenridge, N. J.

Application June 23, 1949, Serial No. 100,829

4 Claims. (Cl. 248—178)

The present invention relates to camera synchronizers and more particularly to an adjustable bracket for supporting both the camera and the synchronizer.

Heretofore, it has been customary in the art to secure the synchronizer directly to the camera, or to have the latter located remote from the camera, so that the camera is held by one hand of the photographer and the synchronizer held and operated by the other hand. In the latter instance, this has made it exceptionally awkward for the photographer making it difficult to hold the camera steady during the taking of an exposure. Where the synchronizer has been secured directly to the camera, this limits the positions of the two relative to each other, and more significantly, necessitates a synchronizer's being restricted in many instances to one specific camera model.

It is accordingly an object of the present invention to provide an adjustable bracket for supporting both a camera and a synchronizer in definite relationship relative to each other.

Another object of the present invention is the provision of an adjustable supporting bracket for substantially any model camera and any model synchronizer and wherein the synchronizer may be supported in various selected positions relative to the camera.

Another object of the present invention is the provision of what may be termed a universal adjustable supporting bracket for a camera and a synchronizer of substantially any model and wherein the synchronizer may be mounted on the bracket in practically any desired relative position.

Still further objects of the present invention will become obvious to those skilled in the art by reference to the accompanying drawing wherein:

Fig. 1 is a side elevational view of the adjustable supporting bracket of the present invention and showing a camera and synchronizer mounted thereon;

Fig. 2 is a rear elevational view of the arrangement as shown in Fig. 1; and

Fig. 3 is a cross-sectional view taken on the line III—III of Fig. 2.

Referring now to the drawings in detail, the adjustable supporting bracket of the present invention comprises a sturdy rectangular metallic frame 5 having pairs of substantially identical sides. As shown in Figs. 1 and 2, the pair of shorter sides 6 and 7 form the top and bottom of the rectangular frame, while the longer sides 8 and 9 constitute the sides as illustrated. The top 6 and bottom 7 are each provided with short angularly bent ends 10 extending parallel to the sides 8 and 9 and for the purpose of fastening the top and bottom to the sides of the metallic frame 5 large knurl-headed screws 12 pass through the sides 8 and 9 and threadedly engage the angular ends 10 of the top 6 and bottom 7, which screws also form a pivot for axial rotation of the top and bottom. A grooved washer 11 is disposed between the underside of the screws 12 and the angular end portions 10.

A camera of substantially any model, such as shown in dotted lines in Figs. 1 and 2 and indicated by the legend "camera," fits within the metallic frame 5 and is secured in place by a knurl headed screw 13 passing through the bottom 7 which screw is provided with an internally threaded bore for engagement by the customary stud provided on a tripod or other type stand. In a somewhat similar manner a knurl headed screw 14 passes through the top 6 and threadedly engages the synchronizer unit comprising an angular support 15, to which is adjustably secured the usual socket 16 for a photoflash lamp 17 surrounded by the reflector 18, and the battery case 19 rigidly fastened to the angular support 15. By reference to Fig. 3, it will be noted that the top 6 of the frame 5 is provided with a slot 20 through which the knurled screw 14 passes, thus allowing adjustment of the synchronizer unit longitudinally of the top 6 for substantially the length thereof, so as to position the lamp at various positions relative to the camera lens. A similar longitudinal slot 21 is likewise provided in the bottom 7 through which the screw 13 passes to also allow for some adjustment of the camera.

Likewise, as shown in Fig. 1, the sides 8 and 9 are provided with longitudinal slots 22 and 23 extending an appreciable distance from the top end thereof and through which the large knurled head screws 12 pass to support the top 6, thus allowing not only axial adjustment of the top 6 about its pivot formed by the screws 12, but also longitudinal adjustment of the top relative to the sides 8 and 9.

Although the bottom 7 is shown as being only axially adjustable about its pivot formed by its screws 12, it may also be made longitudinally adjustable relative to the sides 8 and 9 by extending the slots 22 and 23, if desired.

To enable the camera and synchronizing unit carried by the supporting bracket 5 to be positioned immobile on a table top or the like, a pair of legs 24 and 25 are pivotally connected to the sides 8 and 9, also by means of knurled head screws 26 and 27, which thus serve not only as pivots, but also as locks to secure the legs in their desired angular position, such as shown by dotted lines in Fig. 1 and the full lines in Fig. 2.

From the foregoing it will become obvious that the rectangular supporting bracket of the present invention carries both the camera and synronizer in substantially any desired spaced relation relative to each other. Since two of the sides, and shown herein as the top 6 and bottom 7, are axially adjustable with one side (top 6) being longitudinally adjustable relative to the longer sides 8 and 9 substantially universal adjustment is obtainable. Moreover, while the synchronizer is shown as being supported by the top 6 for longitudinal adjustment relative thereto, it is obvious that the synchronizer may be secured to either of the sides 8 or 9 and longitudinally adjustable with respect thereto, simply by passing the screw 14 through either of the slots 22 or 23, thus securing the angular bracket 15 to the desired side wall 8 or 9.

Due to the substantially universal adjustment provided by the present supporting bracket, the entire unit with camera and synchronizer in place may be readily placed in a carrying case by simply rotating the top 6 about its pivot, which thus positions the synchronizer unit from the full line position to the dotted line position, as shown in Fig. 2, wherein the reflector 18 will then be in parallel contact with the closed camera. It will also be understood that while a pair of large knurl-headed screws 12 have been shown and described as both a pivot and lock for holding the top 6 and bottom 7 in any desired axial position, only one such screw may be used with a rivet, bolt or other frictional pivot being substituted for one of the screws of the pair.

Although one specific embodiment of the present invention has been shown and described, it is obvious that other modifications thereof may be made without departing from the spirit and scope of the appended claims.

I claim:

1. A unitary support for a camera and a synchronizer comprising a rectangular frame bracket having at least one of its sides rotatably adjustable relative to the remainder of said bracket about an axis parallel to said rotatably adjustable side, fastening means carried by one of the sides of said bracket and engageable with a camera for securing the latter entirely within the frame of said bracket, and fastening means carried by one of the sides of said bracket and engageable with a synchronizer for securing the latter in various adjusted positions to said bracket.

2. A unitary support for a camera and a synchronizer comprising a rectangular frame bracket, means engageable with one of the sides of said bracket and pivotally connected to two of the other sides thereof to enable axial and longitudinal adjustment of said pivoted side to various positions relative to the remainder of said bracket, fastening means carried by one of the sides of said bracket and engageable with the camera for securing the latter entirely within the frame of said bracket, a longitudinal slot in one of the sides of said bracket, and fastening means carried by the slotted side of said bracket and engageable with the synchronizer for securing the latter in various adjusted positions along the slot in the side of said bracket.

3. A unitary support for a camera and a synchronizer comprising a rectangular bracket, means engageable with one of the sides of said bracket and pivotally connected to two of the other sides thereof to enable axial and longitudinal adjustment of said pivoted side to various positions relative to the remainder of said bracket, fastening means carried by one of the sides of said bracket and engageable with the camera for securing the latter to said bracket, fastening means carried by one of the sides of said bracket and engageable with the synchronizer for securing the latter to said bracket, and a pair of leg members adjustably secured to said bracket to maintain said bracket with the camera and synchronizer carried thereby in a steady position upon a supporting surface.

4. A unitary support for a camera and a synchronizer comprising a rectangular bracket, longitudinal slots provided in at least two of the sides of said bracket, fastening means passing through said slots and pivotally connected to a third longitudinally slotted side of said bracket to enable axial and longitudinal adjustment of said third side relative to the other slotted sides of said bracket, fastening means carried by one of the sides of said bracket and engageable with the camera for securing the latter to said bracket, and fastening means passing through one of the longitudinally slotted sides of said bracket and engageable with the synchronizer for securing the latter in various adjusted positions along the longitudinal slot in the side of said bracket.

SAMUEL MENDELSOHN.

References Cited in the file of this patent

UNITED STATES PATENTS

| Number | Name | Date |
|---|---|---|
| 541,864 | Loomis | July 2, 1895 |
| 588,253 | Wagner | Aug. 17, 1897 |
| 796,007 | Packard | Aug. 1, 1905 |
| 1,006,693 | Shaw | Oct. 24, 1911 |
| 1,130,907 | King | Mar. 9, 1915 |
| 1,576,457 | Petty | Mar. 9, 1926 |
| 2,495,265 | Krogman | Jan. 24, 1950 |
| 2,500,379 | Robinson | Mar. 14, 1950 |